United States Patent [19]

Gupta

[11] 4,327,864
[45] May 4, 1982

[54] MULTIPLE FUNCTION PNEUMATIC THERMOSTAT

[75] Inventor: Alankar Gupta, Renton, Wash.

[73] Assignee: The Boeing Company, Seattle, Wash.

[21] Appl. No.: 192,249

[22] Filed: Sep. 30, 1980

[51] Int. Cl.³ .............................................. G05D 23/12
[52] U.S. Cl. ........................................ 236/86; 137/82;
    137/625.12; 137/625.4; 137/881
[58] Field of Search ............... 236/100, 99 K, 99 R,
    236/86; 137/82, 881, 625.12, 625.4, 625.62, 861

[56] References Cited
U.S. PATENT DOCUMENTS

| | | | |
|---|---|---|---|
| 2,944,524 | 7/1960 | Brandstadter et al. | 137/625.62 X |
| 3,047,010 | 7/1962 | Rothfuss | 137/82 X |
| 3,394,687 | 7/1968 | Scott | 137/625.12 X |
| 3,528,450 | 9/1970 | Brockway et al. | 137/625.62 X |
| 3,598,020 | 8/1971 | Blok et al. | 137/82 X |
| 3,841,551 | 10/1974 | Ota | 236/100 X |
| 3,955,760 | 5/1976 | Ridenour et al. | 236/86 |
| 4,036,433 | 7/1977 | Wagner et al. | 236/86 X |

Primary Examiner—William E. Tapolcai, Jr.
Attorney, Agent, or Firm—Christensen, O'Connor, Johnson & Kindness

[57] ABSTRACT

A thermostat for a pneumatic control system controls output pressures to a plurality of elements to be controlled. The thermostat can control output pressure directly or inversely and linearly or nonlinearly with respect to temperature. Additionally, the pressures can be controlled sequentially or simultaneously.

5 Claims, 5 Drawing Figures

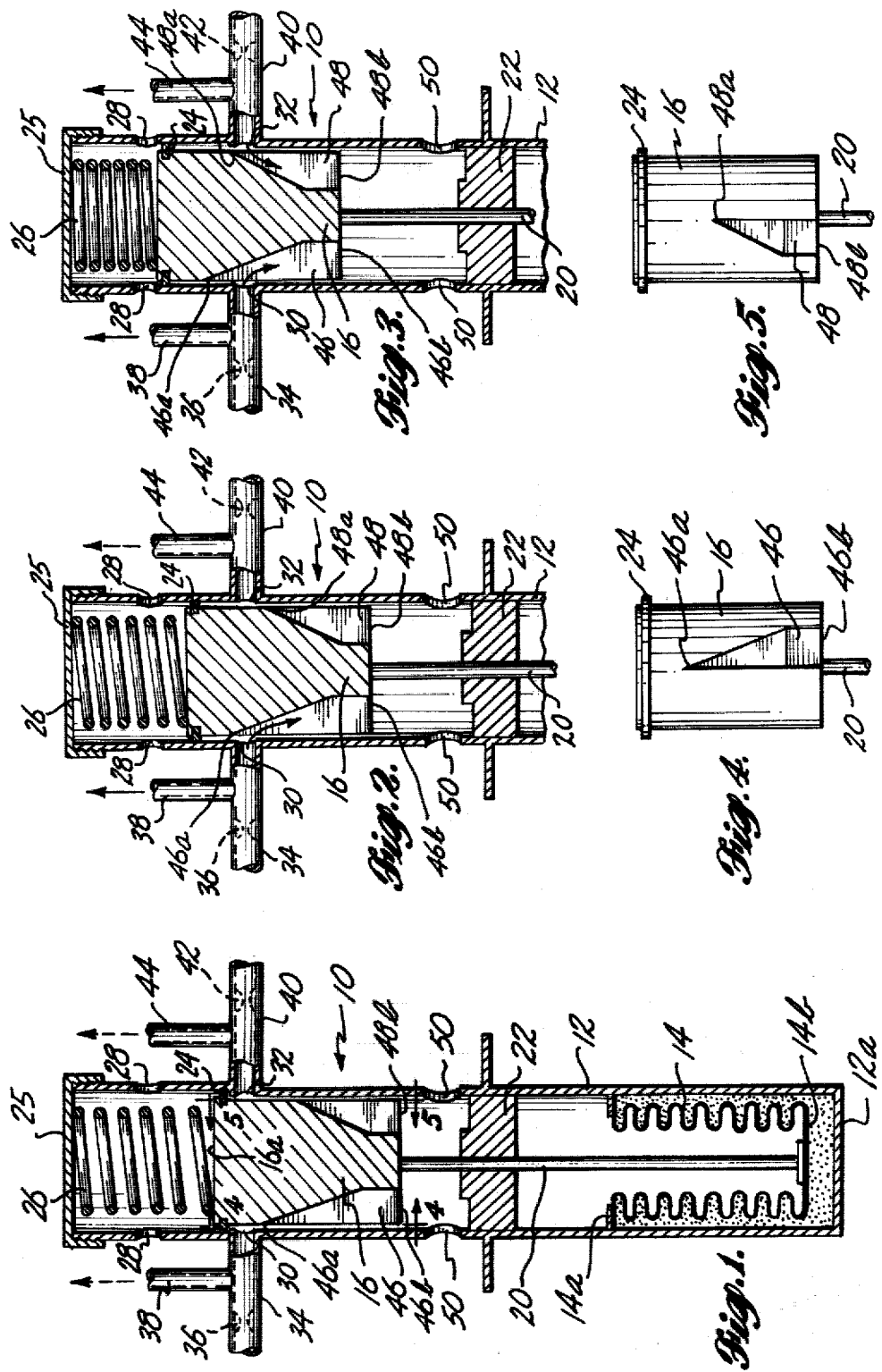

MULTIPLE FUNCTION PNEUMATIC THERMOSTAT

BACKGROUND OF THE INVENTION

The present invention relates to thermostats, and more particularly to a temperature responsive, fluid control valve for pneumatic control systems that performs multiple control functions.

Thermostats for pneumatic control systems are generally of the type that have a temperature responsive expansible element connected to a valve that opens or closes a port to either apply pressurized control fluid to an element to be operated or to bleed pressurized control fluid from that element. It is a broad object of the present invention to provide an improved thermostat for pneumatic control systems that can perform multiple control functions upon a single throw of a temperature responsive expansible element. More particularly, it is an object of the present invention to provide a thermostat for a pneumatic control system that can vary control pressure to two or more elements to be controlled, simultaneously or sequentially, inversely or directly proportional to a temperature change, and, linearly or nonlinearly with respect to a change in temperature.

SUMMARY OF THE INVENTION

In accordance with the foregoing objects, and other objects that will become apparent to one of ordinary skill after reading the following specification, the present invention provides a thermostatic valve for a pneumatic control system that includes a temperature-responsive expansible element, a cylinder, and a piston mounted for reciprocation in the cylinder. The piston is coupled to the temperature-responsive expansible element so as to move in the cylinder in reaction to expansion and contraction of that element. The cylinder has first and second control fluid ports and at least a third control fluid port axially spaced from the first and second ports. The piston has first and second fluid passages therein. One end of each of these passages communicates between respective first and second, preselected locations on the piston wall and one end of the piston. The preselected locations are positioned relative to the first and second control fluid ports in the cylinder wall so that as the piston moves in the cylinder, these ends of the passages will be placed in selective communication with the first and second control fluid ports while the other ends of the passages will be placed in communication with the third control fluid port.

BRIEF DESCRIPTION OF THE DRAWINGS

A better understanding of the present invention can be derived by reading the ensuing specification in conjunction with the accompanying drawings wherein:

FIG. 1 is an elevation view in cross section of the thermostatically controlled valve for a pneumatic control system constructed in accordance with the present invention having two control ports and showing both control ports closed;

FIG. 2 is a view similar to FIG. 1 showing one of the control ports opened;

FIG. 3 is a view similar to FIG. 1 showing both of the control ports opened;

FIG. 4 is a view of the piston-shaped valve member taken along a line similar to view line 4—4 of FIG. 1; and FIG. 5 is a view of the piston-shaped valve member taken along a view line similar to 5—5 in FIG. 1.

DETAILED DESCRIPTION OF THE INVENTION

Referring now to FIG. 1, one embodiment of the thermostatically controlled valve 10 is illustrated. The three major elements of the valve are an elongated cylindrical shell 12, a temperature-responsive bellows 14, and a piston 16. The bellows 14 is of conventional construction and comprises a fluted expansible member with a fluid hermetically sealed between the bellows and the wall of the shell 12. The fluid has a high coefficient of expansion, thus causing the bellows assembly to expand and contract along its axis in response to changes in temperature. One end 14a of the bellows is affixed to the shell at a location spaced from the lower end 12a of the cylindrical shell. The other end 14b of the bellows is positioned between the first end 14a and the lower end 12a of the shell. This end of the cylindrical shell 12 is inserted into a fluid stream, the temperature of which is to be sensed. Fluid flowing past the thermally conductive surface of the shell 12 causes the fluid between the shell and the bellows to expand or contract as the case may be. A piston rod 20 is affixed to the other end 14b of the bellows assembly 14 and extends upwardly through the bellows 14 and slidably through a divider 22 mounted in the central portion of the cylindrical assembly. The piston rod thus can reciprocate in the divider in reaction to expansion and contraction of the bellows assembly 14.

The piston 16 is mounted for reciprocation in the end of the cylindrical shell that is on the opposite side of the divider 22 from the bellows 14. The upper end of the cylinder carries a piston ring 24 that seals the upper end of the piston against the walls of the cylinder assembly. An end cap 25 threadably engages the end of the cylindrical shell 12 adjacent the piston 16. A spring 26 is interposed between the end cap 25 and the top of the piston 16 so as to bias the piston in a downward direction against the upwardly directed expansion force of the bellows 14 to assist the bellows in retracting upon a reduction in temperature of the sensed fluid. Ports 28 are located in the cylindrical shell between the end cap 25 and the upper end of the piston 16. The ports 28 are provided to equalize the pressure in the upper end of the shell 12 with that of the atmosphere so that pressure variances in the upper end of the shell 12 do not inhibit free movement of the piston 16. First and second control ports 30 and 32 are positioned in the side walls of the cylindrical shell 12 below but adjacent the upper surface 16a of the piston 16. Control port 30 is coupled to a conduit 34 containing a flow restrictor 36. Conduit 34 is coupled to a source (not shown) of pressurized control fluid. Another conduit 38 is coupled to the first conduit 34 between the control port 30 and the restrictor 36. The other end of the conduit 38 is coupled to a device (not shown) to be controlled by an increase and decrease in the control pressure present in conduit 38. Similarly, the control port 32 is coupled to another conduit 40 containing a restrictor 42. The conduit 40 is in turn coupled to a source (not shown) of pressurized control fluid. Another conduit 44, coupled to a second device (not shown) to be controlled, is in turn coupled to the conduit 40 between the control port 32 and the restrictor 42.

Referring now to FIGS. 1 and 4, a passage 46 is formed on one of the sides of the piston 16. Passage 46 is notched into the side of the piston 16 so that in this embodiment, the notch begins at a triangular apex 46a spaced axially downwardly from the upper surface 16a of the piston 16. The bottom end 46b of the passage communicates along the side of the piston with the bottom of the piston. Referring to FIG. 5, a similar passage 48 is formed on the opposite side of the piston 16. The apex 48a of the passage 48 is, however, positioned axially further down the side of the piston than was the apex 46a of the passage 46. Likewise, the bottom 48b of the passage 48 communicates with the bottom end of the piston.

Referring back to FIG. 1, piston 16 is shown in a lowermost position corresponding to a given low temperature. In this position, both control ports 30 and 32 are blocked by the upper reaches of the piston 16. As the temperature of the fluid surrounding the shell 12 increases, the bellows 14 will be foreshortened, exerting an upward force on the piston rod 20 and thus raising the piston 16 upwardly against the biasing force of spring 26 toward the position as shown in FIG. 2. As the piston 16 rises to this position, the apex 46a of the passage 46 is circumferentially positioned on the piston 16 such that it passes across control port 30. As it does, the pressurized control fluid present in conduit 38 is bled through passage 46 and vented to the atmosphere through ambient vents 50 in the side wall of the cylindrical shell 12 below the piston 16. Similarly, as the temperature continues to increase, the piston rises further toward the position shown in FIG. 3. The apex 48a of the other passage 48 is circumferentially positioned on the piston 16 such that it passes across the control port 32, thus bleeding pressurized control fluid from the conduit 44 through passage 48. In this manner, the elements to be controlled by the pressurized control fluid in conduits 38 and 44 can be actuated in response to a temperature change sensed by the fluid surrounding the bellows 14.

As the temperature of the fluid surrounding the shell 12 decreases, the bellows will increase in length under the influence of the biasing spring 26. As it does so, the piston 16 travels downwardly first closing control port 32 then control port 30. When the ports are closed, control fluid pressure once again rises in the conduits 44 and 38 to actuate the devices being controlled.

One of ordinary skill will be able to effect various changes, substitutions of equivalents, and other alterations without departing from the broad concepts disclosed. For example, the rate and linearity of bleed-off of pressurized control fluid through the control ports can be varied by varying or changing the shape of the passage 46. The passages illustrated in connection with the disclosed embodiment initially provide for a slow bleed-off that increases in rate as the temperature increases. If a faster initial control fluid bleed were desired, the passages can be shaped so that a greater area of the control port is initially exposed as the piston rises. As another example, with relatively simple plumbing modifications, the control valve of the present invention can be utilized to cause an increase in control fluid pressure at the device to be controlled in resopnse to a rise in temperature. It is also possible by varying the locations of the passages 46 and 48 to provide for simultaneous control of a plurality of devices, or to vary the interval between control of the devices in response to temperature changes. And as a last example, any desired number of devices can be controlled by increasing the number of passages and corresponding control parts. It is accordingly intended that the scope of Letters Patent granted hereon be limited only by the definition contained in the appended claims and equivalents thereof.

The embodiments of the invention in which an exclusive property or privilege is claimed are defined as follows:

1. A temperature-responsive, fluid control valve comprising:
 a temperature-responsive expansible element,
 a cylinder having a side wall, said side wall having first and second control fluid ports and at least a third control fluid port axially spaced from said first and second ports,
 piston means having a cylindrical piston wall mounted for reciprocation in said cylinder in reaction to expansion and contraction of said expansible element, said piston means having at least one circumferential portion thereof in sealing engagement with said cylinder wall, said piston means having first and second fluid passages therein, each of said passages having a first end and a second end, the first ends of said passages opening on said piston wall at preselected locations positioned relative to said first and second control fluid ports such that the first ends of said first and second passages are respectively placed in selective communciation with said first and second control fluid ports as said piston means moves in said cylinder, said second end of each of said passages opening on one end of said piston means such that said passages are each placed in communication with said third control port in said cylinder wall.

2. The fluid control valve of claim 1 wherein said first and second fluid passages in said piston means comprise first and second elongated notches formed in said piston wall, said notches terminating at angular apexes forming said first ends of said passages opening at said preselected locations on said piston wall, such that fluid flow through said passages is varied in a predetermined manner as said piston means moves axially in said cyliner, said preselected locations being at axially spaced locations on said piston wall.

3. The control valve of claim 1 wherein said third control fluid port is spaced from the end of said piston means with which the second ends of said passages communicate.

4. The control valve of claim 3 wherein said first and second control fluid ports are adapted for coupling to a source of control fluid, said third control fluid port being in communication with the atmosphere.

5. The control valve of claim 4 wherein said cylinder has an end wall, and wherein said piston is interposed in said cylinder between said end wall and said expansible element, said expansible element being coupled to said piston by a piston rod.

* * * * *